(12) United States Patent
Semnisky et al.

(10) Patent No.: US 11,504,784 B2
(45) Date of Patent: Nov. 22, 2022

(54) CUTTING TOOL WITH INTERCONNECTED ARMS FOR INCREASED STIFFNESS TO WEIGHT RATIO

(71) Applicant: Kennametal Inc., Latrobe, PA (US)

(72) Inventors: Logan M. Semnisky, Latrobe, PA (US); Alan J. Bookheimer, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 108 days.

(21) Appl. No.: 17/115,997

(22) Filed: Dec. 9, 2020

(65) Prior Publication Data

US 2022/0176473 A1    Jun. 9, 2022

(51) Int. Cl.
*B23D 77/02* (2006.01)

(52) U.S. Cl.
CPC .................................. *B23D 77/02* (2013.01)

(58) Field of Classification Search
CPC ...... B23D 77/14; B23D 77/025; B23D 77/02; B23D 77/003; B23D 2277/06; B23D 2277/10; B23D 2277/46; B23C 5/006; B23C 5/109; B23C 5/02; B23C 2210/24; B23C 2210/56
See application file for complete search history.

(56) References Cited

U.S. PATENT DOCUMENTS

| | | | |
|---|---|---|---|
| 5,135,337 A | 8/1992 | Adamson | |
| 5,152,640 A | 10/1992 | Regis et al. | |
| 5,605,420 A | 2/1997 | Feldsine | |
| 5,921,727 A | 7/1999 | Depperman | |
| 5,934,842 A | 8/1999 | Gupta | |
| 6,120,218 A | 9/2000 | Bishop | |
| 6,655,883 B2 | 12/2003 | Maar | |
| 6,913,428 B2 | 7/2005 | Kress | |

(Continued)

FOREIGN PATENT DOCUMENTS

| CN | 209139934 U | 7/2019 |
|---|---|---|
| DE | 19934125 | 1/2001 |

(Continued)

OTHER PUBLICATIONS

Special light milling head.

(Continued)

*Primary Examiner* — Boyer D Ashley
*Assistant Examiner* — Stephen Sun Cha
(74) *Attorney, Agent, or Firm* — Larry R. Meenan

(57) ABSTRACT

A cutting tool with interconnected arms that increases the stiffness to weight ratio of the cutting tool is described. The principles of the invention can be applied to any cutting tool, such as a reamer, a milling cutter, a slotting cutter, and the like. In one example, a cutting ring includes a cutting head assembly with a leading arm, a trailing arm, and a cutting head supported by the leading arm and the trailing arm. The trailing arm interconnects with the leading arm of an adjacent cutting head assembly, and the leading arm interconnects with a trailing arm of another adjacent cutting head assembly. As a result of this interconnection of arms, the axial, radial and tangential stiffness to weight ratio of the cutting tool is increased. A support member may be included to further increase the stiffness to weight ratio.

18 Claims, 7 Drawing Sheets

(56) References Cited

U.S. PATENT DOCUMENTS

| | | |
|---|---|---|
| 8,764,354 B2 | 7/2014 | Schuffenhauer et al. |
| 8,950,985 B2 | 2/2015 | Durand-Terrasson |
| 9,056,357 B2 | 6/2015 | Bozkurt |
| 9,283,624 B2 | 3/2016 | Freyermuth et al. |
| 9,623,494 B2 | 4/2017 | Bozkurt |
| 10,464,138 B2 | 11/2019 | Kozaki et al. |
| 10,799,960 B2 | 10/2020 | Zetek et al. |
| 10,940,551 B1 | 3/2021 | Semnisky et al. |
| 2005/0019110 A1 | 1/2005 | Astrakhan |
| 2011/0182676 A1 | 7/2011 | Frank et al. |
| 2011/0188954 A1 | 8/2011 | Frank |
| 2013/0136551 A1* | 5/2013 | Nisikawa ............ B23B 51/0054 408/83 |
| 2013/0156520 A1 | 6/2013 | Hacker et al. |
| 2014/0161543 A1* | 6/2014 | Francis ................ B23C 5/06 407/115 |
| 2019/0099816 A1 | 4/2019 | Zetek et al. |
| 2019/0314903 A1 | 10/2019 | Haenle et al. |
| 2019/0314904 A1 | 10/2019 | Haenle |
| 2020/0055129 A1 | 2/2020 | Leuze et al. |
| 2022/0023960 A1 | 1/2022 | Ljatifi et al. |

FOREIGN PATENT DOCUMENTS

| | | | |
|---|---|---|---|
| DE | 10359854 A1 | 7/2005 | |
| DE | 102009022051 B3 * | 9/2010 | ............ B23C 5/006 |
| EP | 0074542 A2 | 3/1983 | |
| EP | 1 984 135 B1 | 10/2008 | |
| EP | 3772384 A1 | 2/2021 | |
| EP | 3819055 A1 | 5/2021 | |
| FR | 2927555 A3 | 8/2009 | |
| FR | 2967366 A1 | 5/2012 | |
| JP | 2017030075 A | 2/2017 | |
| JP | 2018149655 A | 9/2018 | |
| JP | 2018149656 A | 9/2018 | |
| WO | WO1987004969 A1 | 8/1987 | |
| WO | 2010/020234 | 8/2009 | |
| WO | WO2010097082 A1 | 9/2010 | |
| WO | WO2012101319 A1 | 8/2012 | |
| WO | WO2019002050 A1 | 1/2019 | |
| WO | WO2020118460 A1 | 6/2020 | |
| WO | WO2021023489 A1 | 2/2021 | |

OTHER PUBLICATIONS

Apr. 13, 2022 Office action (3 months) (US Only) U.S. Appl. No. 17/116,782.

Apr. 12, 2022 International Search Report WO App. No. PCT/US2021/062367.

Mar. 30, 2022 International Search Report WO App. No. PCT/US2021/062322.

Jan. 29, 2021 Search report EP App. No. 20190517.1.

Nov. 5, 2020 Notice of Allowance—U.S. Appl. No. 16/557,533.

* cited by examiner

CUTTING TOOL WITH INTERCONNECTED ARMS FOR INCREASED STIFFNESS TO WEIGHT RATIO

CROSS NOTING TO RELATED APPLICATIONS

This application is related to application Ser. No. 16/557,533, filed on Aug. 30, 2019, the entire contents of which are incorporated herein by reference.

FIELD OF THE INVENTION

In general, the invention relates to cutting tools, and more particularly, to a rotary cutting tool, such as a reamer, a milling cutter, a slotting cutter, and the like, with interconnected arms to increase the stiffness to weight ratio of the rotary cutting tool.

BACKGROUND OF THE INVENTION

During a cutting operation, it is essential to prevent unwanted movement of the cutting tool. It has been observed that a rotary cutting tool, for example, a reamer, a slotting cutter, and the like, may not have the desired stiffness to prevent unwanted movement during a cutting operation. In addition, certain applications require lightweight tooling solutions based on machine and application limits. Certain structures and designs can be used to retain stiffness, while reducing weight.

SUMMARY OF THE INVENTION

The problem of increasing stiffness to prevent unwanted movement in a cutting tool, such as a reamer, a milling cutter, a slotting cutter, and the like, while reducing weight can be solved by providing an interconnected relationship between the leading and trailing arms supporting the cutting head, and a support member that interconnects one or more arms.

In one aspect, a cutting tool has a rotational axis, RA. The cutting tool comprises a cutting ring comprising a cutting head assembly including a leading arm extending radially outwardly from the rotational axis, RA. A trailing arm extends radially outwardly from the rotational axis, RA. A cutting head is supported by the leading arm and the trailing arm. The front cutting ring further comprises a plurality of guide pad assemblies. Each guide pad assembly includes a leading arm extending radially outwardly from the rotational axis, RA. A trailing arm extends radially outwardly from the rotational axis, RA. A guide pad head is supported by the leading arm and the trailing arm. The trailing arm of the cutting head assembly interconnects with the leading arm of a first, adjacent guide pad assembly, and the leading arm of the first cutting head assembly interconnects with a trailing arm of a second, adjacent guide pad assembly to increase an axial, radial and tangential stiffness of the cutting tool, thereby increasing a stiffness to weight ratio of the cutting tool.

In another aspect, a front cutting ring for a cutting tool comprises a sleeve member and a plurality of cutting head assemblies. Each cutting head assembly includes a leading arm extending radially outwardly from a rotational axis, RA, of the cutting ring. A trailing arm extends radially outwardly from the rotational axis, RA, of the cutting ring. A cutting head is supported by the leading arm and the trailing arm. The leading arm of a first cutting head assembly interconnects with the trailing arm of a second, adjacent cutting head assembly, and the trailing arm of the first cutting head assembly interconnects with a leading arm of a third, adjacent cutting head assembly to increase an axial, radial and tangential stiffness of the cutting tool, thereby increasing a stiffness to weight ratio of the cutting tool.

In yet another aspect, a cutting tool comprises a plurality of cutting head assemblies extending radially outward from a rotational axis, RA, of the cutting tool. Each cutting head assembly includes a leading arm, a trailing arm and a cutting head supported by the leading arm and the trailing arm. The cutting head assembly further comprises a support member which interconnects the trailing arms of two adjacent cutting head assemblies. The leading arm of a first cutting head assembly interconnects with the trailing arm of a second, adjacent cutting head assembly, and the trailing arm of the first cutting head assembly interconnects with a leading arm of a third, adjacent cutting head assembly. A support member of the first cutting head assembly interconnects the trailing arm of the first cutting head assembly and the trailing arm of the second, adjacent cutting head assembly. The interconnection of the leading and trailing arms along with the support member increases an axial, radial and tangential stiffness of the cutting tool, thereby increasing a stiffness to weight ratio of the cutting tool.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
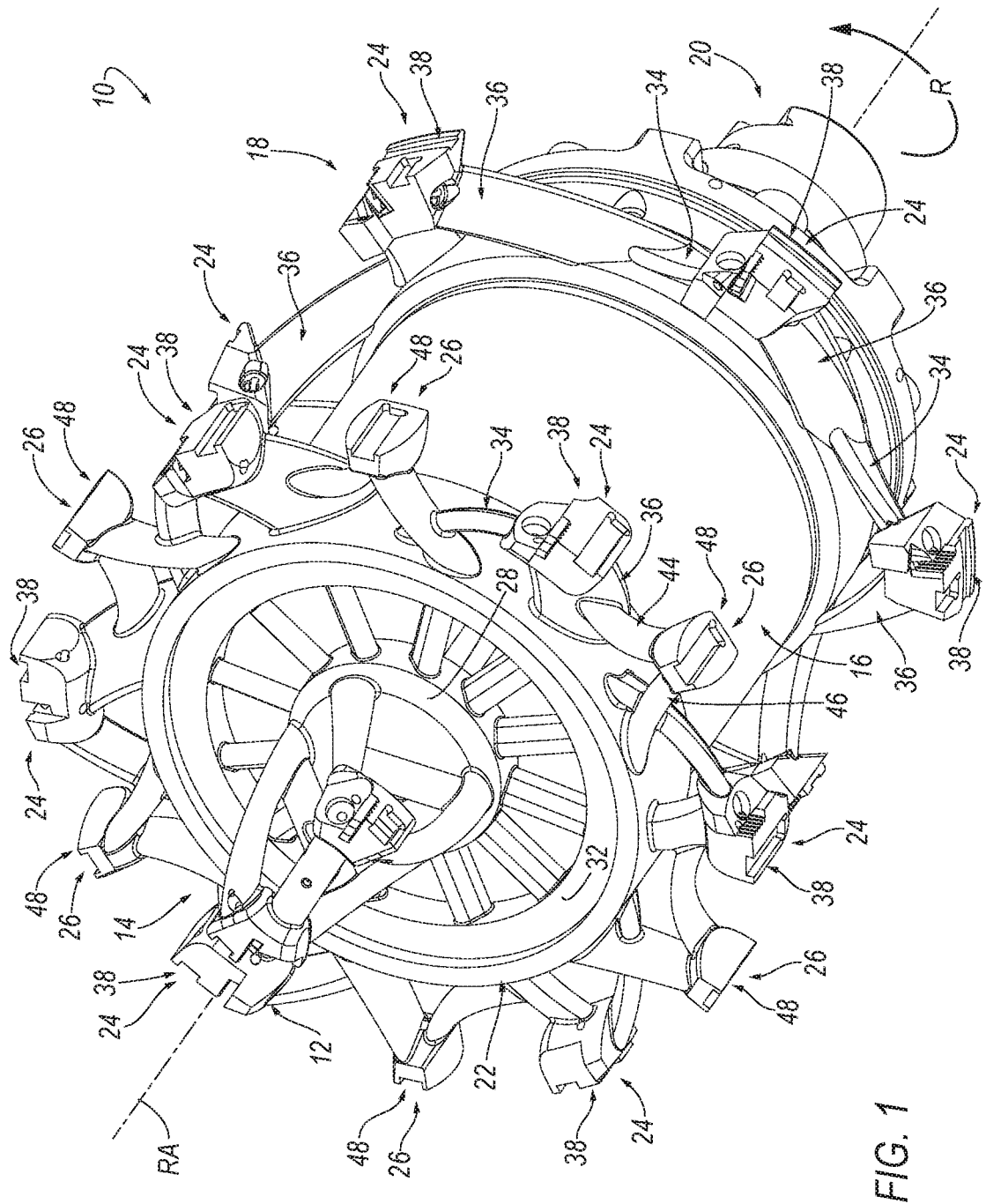
FIG. 1 is a front perspective view of a cutting tool, such as a lightweight reamer, according to an embodiment of the invention.
Figure 2:
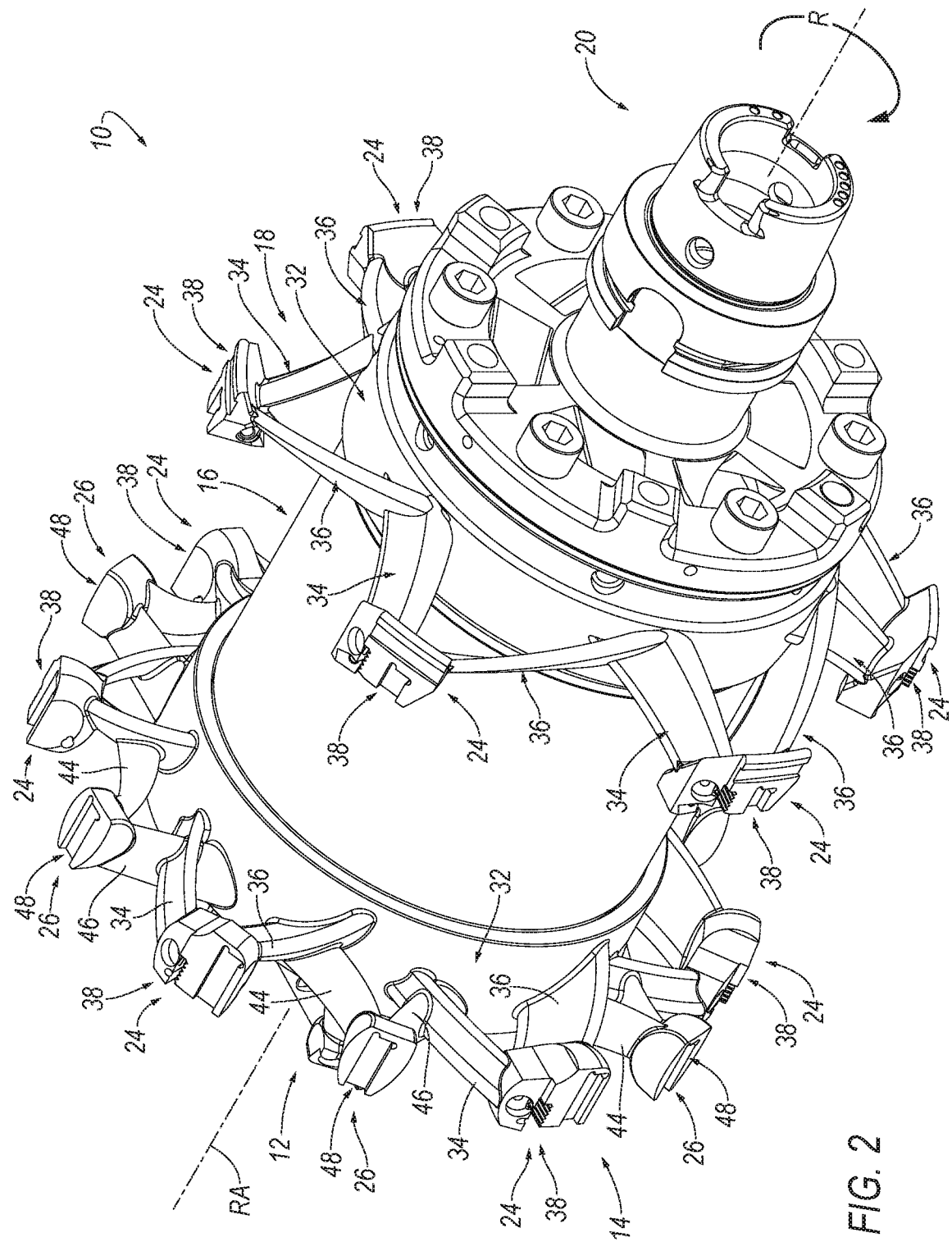
FIG. 2 is a rear perspective view of the lightweight reamer of FIG. 1.

Referring now to FIGS. 1 and 2, a cutting tool 10 is shown according to an embodiment of the invention. In the illustrated embodiment, the cutting tool comprises a reamer that rotates in the direction, R, about a central, rotational axis, RA, during operation. Although the cutting tool 10 comprises a reamer in the illustrated embodiment, it should be appreciated that the principles of the invention can be applied to any cutting tool for metal cutting operations, such as a milling cutter, and the like. In addition, the description herein of specific applications should not be a limitation on the scope and extent of the use of the cutting tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "elongate" is defined as something that is longer than it is wide. In other words, the width is smaller than its length.

As used herein, the term "circular" is defined as an object having a shape of a circle, i.e., an object having a simple closed shape. It is the set of points in a plane that are at a given distance from a given point, the center; equivalently it is the curve traced out by a point that moves in a plane so that its distance from a given point is constant. The distance between any of the points and the center is called the radius.

As used herein, the term "3D printing" is any of various processes in which material is joined or solidified under computer control to create a three-dimensional object, with material being added together, such as liquid molecules or powder grains being fused together, typically layer by layer. In the 1990s, 3D printing techniques were considered suitable only to the production of functional or aesthetical prototypes and, back then, a more comprehensive term for 3D printing was rapid prototyping. Today, the precision, repeatability and material range have increased to the point that 3D printing is considered as an industrial production technology, with the official term of "additive manufacturing".

As used herein, the term "hole" is defined as an opening trough something; a gap; a cavity or an aperture that can have any cross-sectional shape.

Referring to FIGS. 1 and 2, the cutting tool 10 of the invention has five basic components:
1) a front cutting body 12;
2) a front cutting ring 14;
3) a center tube 16;
4) a rear cutting ring 18; and
5) a rear machine connection member 20.

The five basic components can be fastened to each other by using any well-known means in the art, such as mechanical fasteners, shrink fitting, brazing, soldering, welding, glue, epoxy, and the like. Alternatively, one or more of the five basic components can be integrally formed using additive manufacturing (i.e., 3D printing). An optional coolant conduit (not shown) can enable the cutting tool 10 to provide fluid, such as coolant, and the like, from the rear machine connection member 20 to the front cutting ring 14, and ultimately to the cutting insert/workpiece interface.

Referring now to FIGS. 3-8, the front cutting ring 14 is shown according to an embodiment of the invention. It should be noted that the invention is not limited by the number of cutting rings, and that the invention can be practiced with only a single cutting ring, or more than two cutting rings.

It should be noted that the front cutting ring 14 is substantially identical to the rear cutting ring 18, except that the rear cutting ring 18 may have a slightly larger cutting diameter and the guide pad assemblies 26 may be omitted. Therefore, only the front cutting ring 14 will be described herein for brevity, and it will be appreciated that any description herein for the front cutting ring 14 also applies to the rear cutting ring 18.

In general, the front cutting ring 14 rotates about the central, rotational axis, RA, and includes a sleeve member 22, a plurality of cutting head assemblies 24 and a plurality of guide pad assemblies 26. In the illustrated embodiment, the front cutting ring 14 has a total of six cutting head assemblies 24 and six guide pad assemblies 26, wherein each cutting head assembly 24 is separated by a guide pad assembly 26. It will be appreciated that the invention is not limited by the number of cutting head assemblies 24 and guide pad assemblies 26, and that the invention can be practiced with any desirable number of cutting head assemblies 24 and guide pad assemblies 26, depending on the physical size of the cutting tool 10. In addition, the guide pad assemblies 26 can be eliminated, and the front cutting ring 14 may comprise only cutting head assemblies 24.

Figure 4:
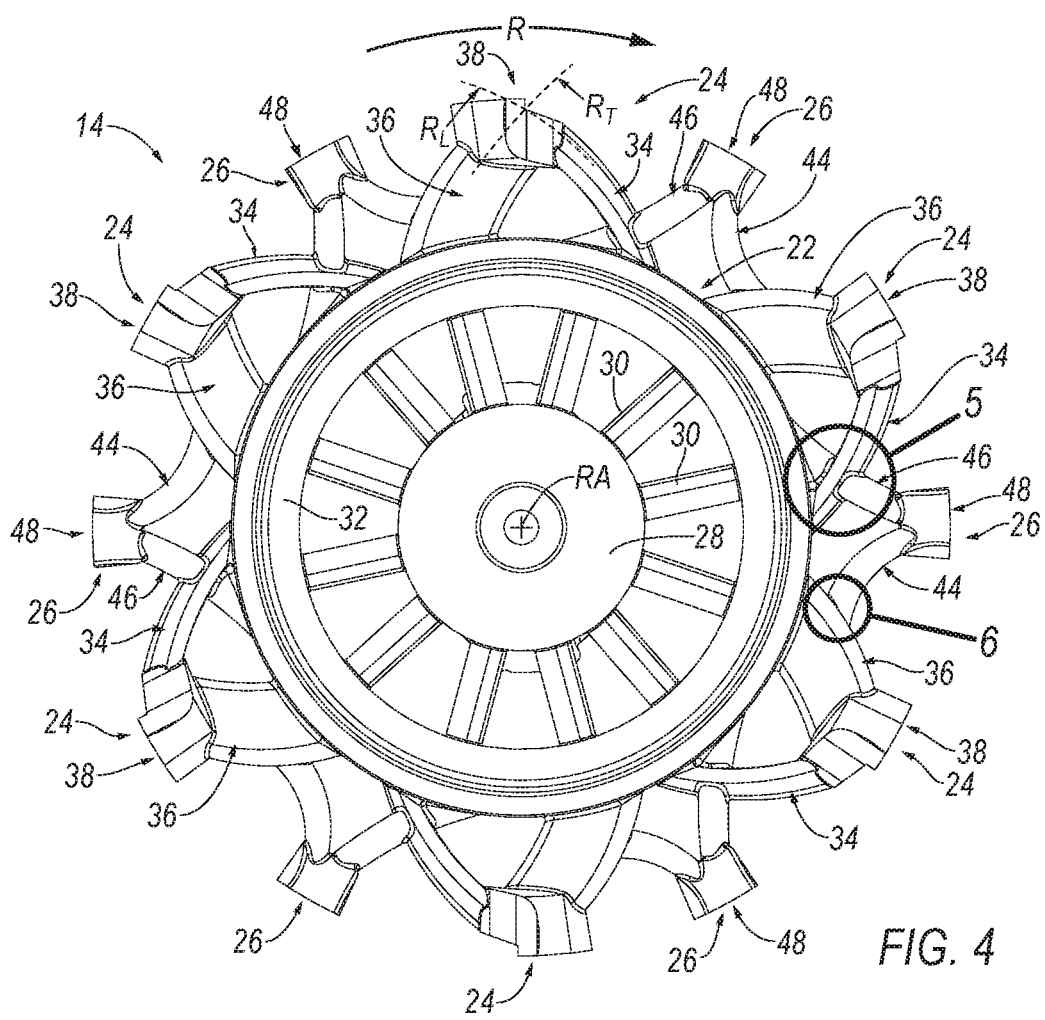
FIG. 4 is a rear view of the front cutting ring of FIG. 3.
Figure 5:
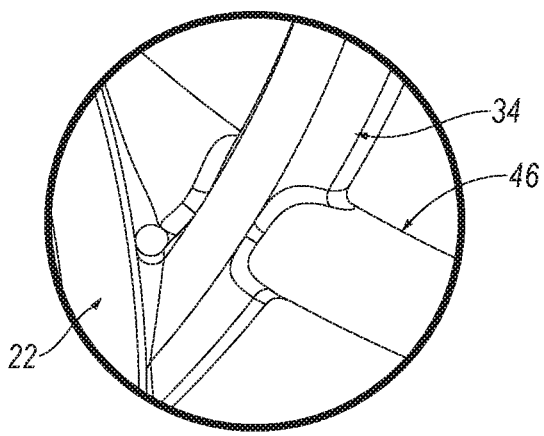
FIG. 5 is an enlarged view of the leading arm of the cutting head assembly and the trailing arm of the guide pad assembly of FIG. 4.
Figure 6:
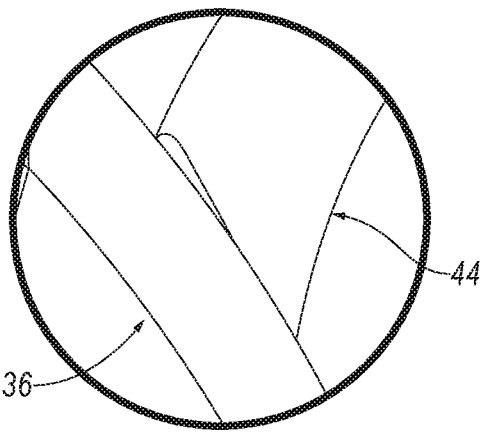
FIG. 6 is an enlarged view of the leading arm of the guide pad assembly and the trailing arm of the cutting head assembly of FIG. 4.

As shown in FIG. 4, for example, the cutting head assemblies 24 are spaced apart from each other about the perimeter of the sleeve member 22. In the illustrated embodiment, the cutting head assemblies 24 are generally unequally spaced about the perimeter of the sleeve member 22. However, it should be appreciated that the cutting head assemblies 24 can be equally spaced about the perimeter of the sleeve member 22.

The front cutting ring 14 can be made of steel material, such as tool steel, using an additive manufacturing (i.e., 3D printing) process. In one embodiment, the front cutting ring 14 has a unitary construction in which the plurality of cutting head assemblies 24 and the plurality of guide pad assemblies 26 are integrally formed with the sleeve member 22. In an alternative embodiment, one or all of the cutting head assemblies 24 and guide pad assemblies 26 can be separately attached to the sleeve member 22.

The front cutting ring 14 also includes a central hub 28 with a plurality of spokes 30 extending radially outward from the central hub 28 to the sleeve member 22. Each spoke 30 may have a fluid dynamic design, such as an airfoil, a turbine blade, and the like, to produce an airflow in an axially forward direction from the rear of the cutting tool 10 to the front of the cutting tool 10.

Each cutting head assembly 24 includes a leading arm 34 extending radially outwardly from the central, rotational axis, RA, a trailing arm 36 extending radially outwardly from the central rotational axis, RA, and a cutting head 38 supported by the leading arm 34 and the trailing arm 36. In the illustrated embodiment, the cutting head 38 includes a cutting insert pocket 40 and a guide pad pocket 42, respectively, as shown in FIG. 3.

In the illustrated embodiment, a sleeve member 22 includes a flange 32 that extends radially inward. The flange 32 and sleeve member 22 secure and position the front cutting ring 14 axially and radially to the center tube 16. It should be noted that the front cutting body 12 is secured to the central hub 28 of the front cutting ring 14. However, the front cutting body 12 could be secured to the sleeve member 22, depending on the dimensions of the front cutting body 12.

Figure 3:
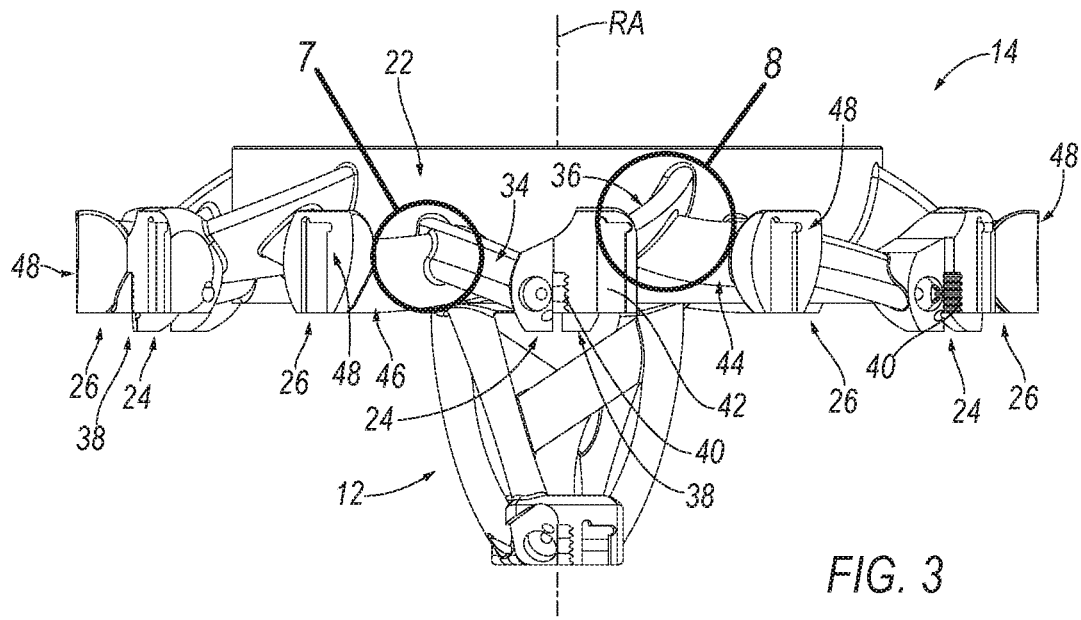
FIG. 3 is a side view of the front cutting ring of the reamer according to an embodiment of the invention, the rear cutting ring being substantially identical to the front cutting ring, except that the rear cutting ring may have a slightly larger cutting diameter and may not include guide pad assemblies.

As shown in FIGS. 3 and 4, the leading arm 34 does not extend in a radial direction from the sleeve member 22 in a linear fashion, but in a curved fashion with a radius of curvature, $R_L$. Similarly, the trailing arm 36 extends in a curved fashion from the sleeve member 22 with a radius of curvature, $R_T$. The radius of curvature, $R_L$, can be same or different in magnitude than the radius of curvature, $R_T$. In addition, the leading arm 34 is curved in an opposite direction with respect to the trailing arm 36. Specifically, the trailing arm 36 curve in the same direction as the direction of rotation, R, (indicated by the arrow) of the cutting tool 10, and the leading arm 34 curve in the opposite direction as the direction of rotation, R, of the cutting tool 10.

Figure 7:
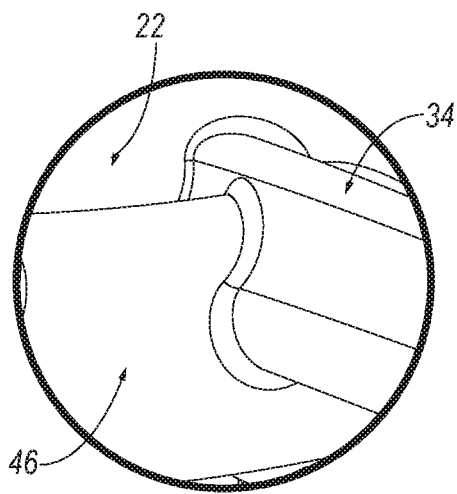
FIG. 7 is an enlarged side view of the leading arm of the cutting head assembly and the trailing arm of the guide pad assembly of FIG. 3.
Figure 8:
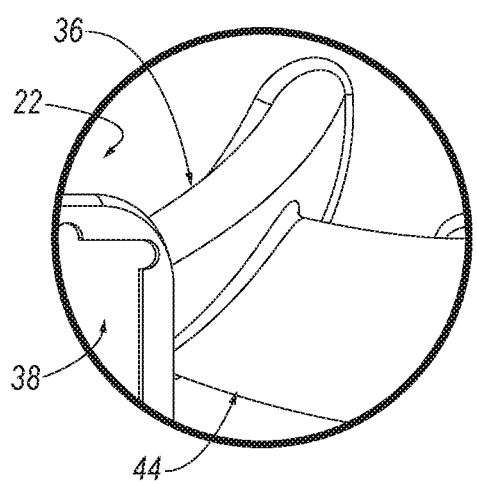
FIG. 8 is another enlarged side view of the leading arm of the guide pad assembly and the trailing arm of the cutting head assembly of FIG. 3.

In addition, the leading arm 34 and the trailing arm 36 sweep along a helical arc. Specifically, the amount of twist of the cross-section of each of the leading arm 34 and the trailing arm 36 varies along the length of each of the leading arm 34 and the trailing arm 36. The helical arc can be constant or variable. It should be noted that the helical arc of the leading arm 34 may be the same magnitude or a different magnitude than the helical arc of the trailing arm 36. For example, the leading arm 34 may have a smaller helical arc than the trailing arm 36. Also, it should be noted that the trailing arm 36 spirals in an opposite direction than the leading arm 34, as shown in FIG. 7. Thus, both the leading arm 34 and the trailing arm 36 curve downward in opposite directions with respect to the direction of rotation, R.

The leading arm 34 and the trailing arm 36 are both connected to the sleeve member 22. In addition, both the leading arm 34 and the trailing arm 36 connect to the cutting head 38 with a downward slope.

In the illustrated embodiment, the leading and trailing arms 34, 36 are directly attached to the sleeve member 22. However, it should be understood that in one embodiment, the leading and trailing arms 34, 36 can be directly attached to the center tube 16, and the sleeve member 22 can be eliminated.

As shown in FIG. 4, similar to the cutting head assembly 24, each guide pad assembly 26 includes a leading arm 44, a trailing arm 46 and a guide pad head 48 capable of receiving a guide pad (not shown) thereon. As shown in FIGS. 5-8, the trailing arm 36 of the cutting head assembly 24 is interconnected with the leading arm 44 of an adjacent guide pad assembly 26. It is noted that the leading arm 44 of the guide pad assembly 26 is not directly connected to the sleeve member 22 of the front cutting ring 14. Oppositely, the leading arm 34 of the cutting head assembly 24 is interconnected with the trailing arm 46 of a different adjacent guide pad assembly 26. This interlocking relationship between the cutting head assemblies 24 and the guide pad assemblies 26 increases the axial, radial and tangential stiffness to weight ratio of the cutting tool 10, thereby resulting in less deflection of the cutting head assemblies 24.

The principles of the invention can be applied to different types of cutting tools. For example, the principles of the invention can be applied to a slotting cutter 100, as shown in FIGS. 9-12.

In general, the slotting cutter 100 includes a sleeve member 122 and a plurality of cutting head assemblies 124. In the illustrated embodiment, the slotting cutter 100 has a total of twelve cutting head assemblies 124. It will be appreciated that the invention is not limited by the number of cutting head assemblies 124, and that the invention can be practiced with any desirable number of cutting head assemblies 124, depending on the physical size of the slotting cutter 100.

Figure 10:
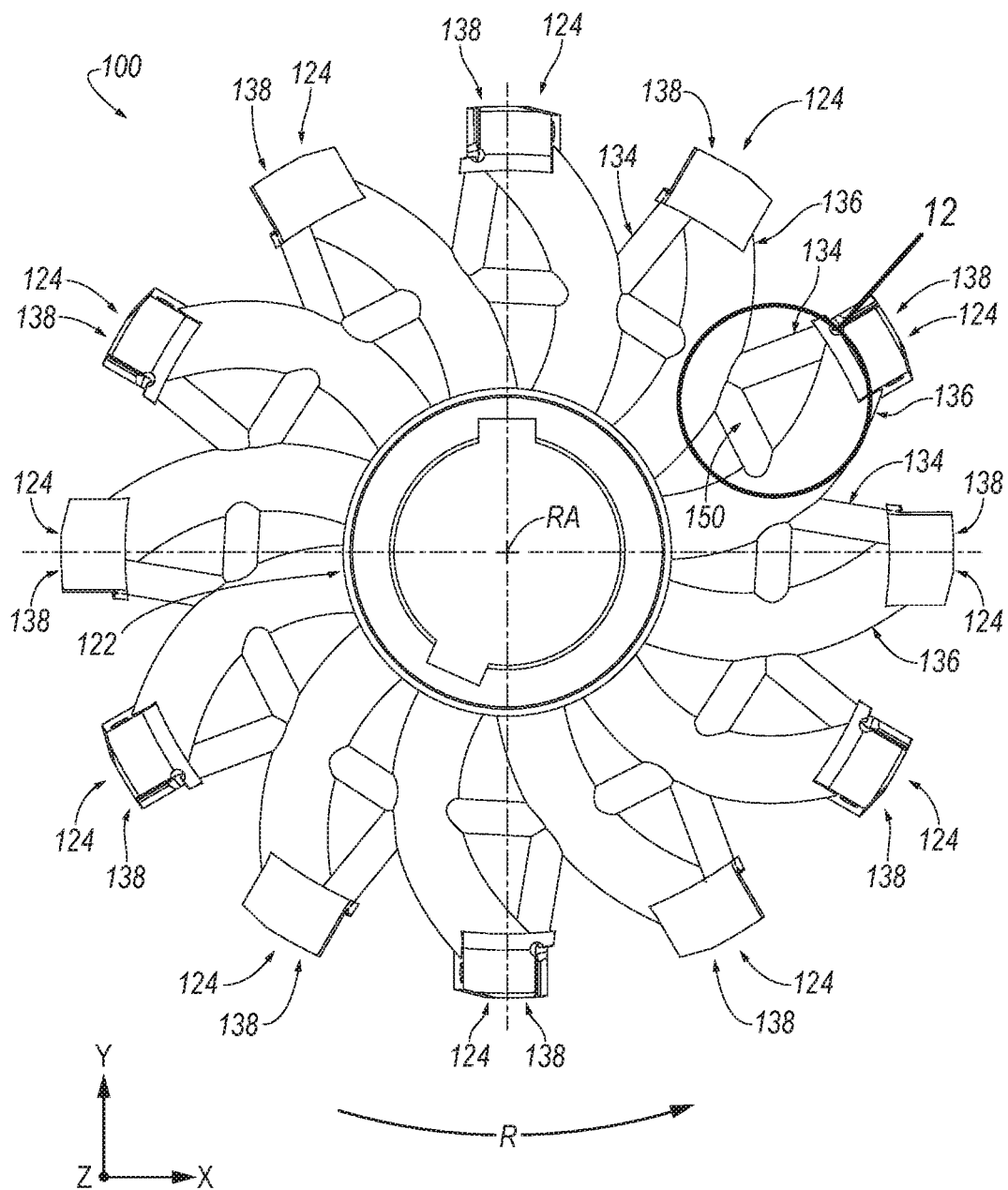
FIG. 10 is a front view of the slotting cutter of FIG. 9.
Figure 11:
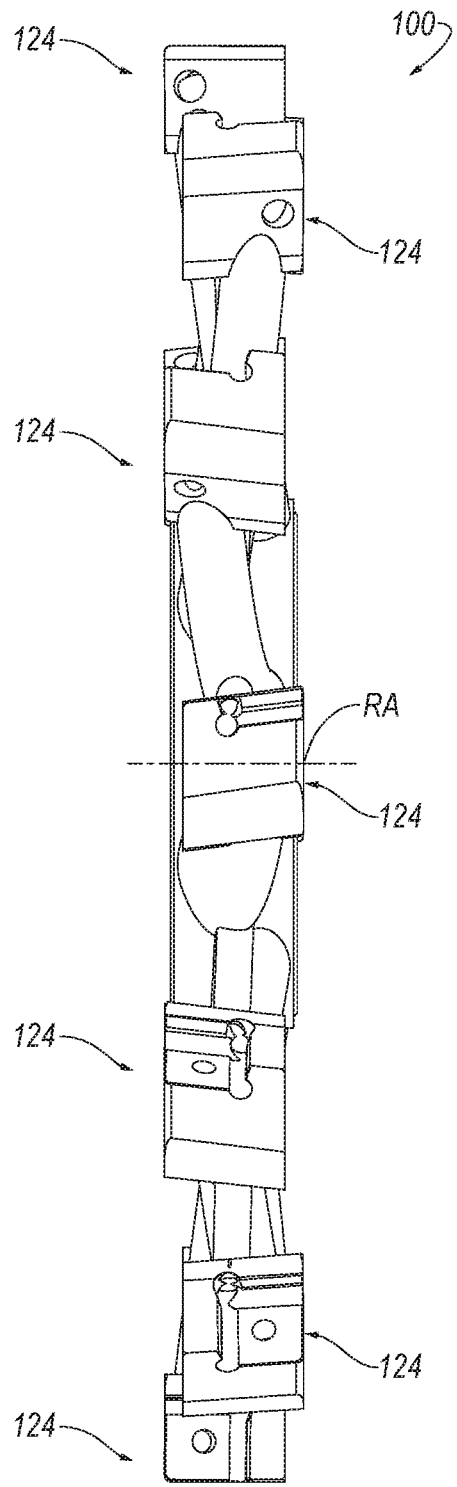
FIG. 11 is a side view of the slotting cutting of FIG. 9.

As shown in FIG. 10, for example, the cutting head assemblies 124 are spaced apart from each other about the perimeter of the sleeve member 122. In the illustrated embodiment, the cutting head assemblies 124 are generally unequally spaced about the perimeter of the sleeve member 122. However, it should be appreciated that the cutting head assemblies 124 can be equally spaced about the perimeter of the sleeve member 122.

The slotting cutter 100 can be made of steel material, such as tool steel, using an additive manufacturing (i.e., 3D printing) process. In one embodiment, the slotting cutter 100 has a unitary construction in which the plurality of cutting head assemblies 124 are integrally formed with the sleeve member 122. In an alternative embodiment, one or all of the cutting head assemblies 124 can be separately attached to the sleeve member 122.

Each cutting head assembly 124 includes a leading arm 134 and a trailing arm 136 that extend radially outward from the rotational axis, RA. Specifically, the leading arm 134 for a first cutting head assembly 124 extends radially outward from the trailing arm 136 of a second, adjacent cutting head assembly 124, and in particular, from the trailing arm 136 of an upstream cutting head assembly 124. Each cutting head assembly 124 includes a cutting head 138 capable of receiving a cutting insert (not shown), as shown in FIG. 9.

Figure 9:
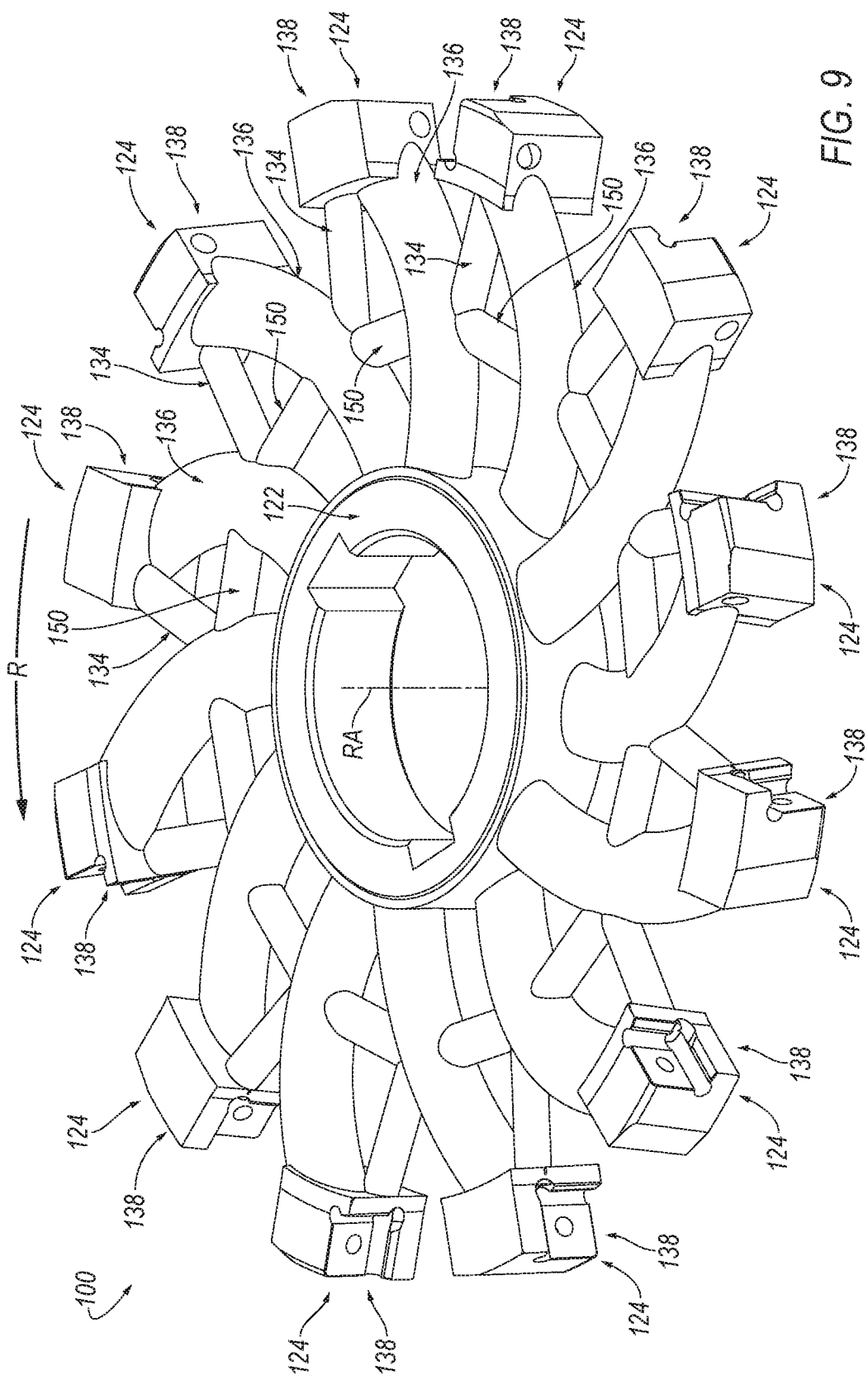
FIG. 9 is a front perspective view of a cutting tool, such as a slotting cutter, according to an embodiment of the invention.
Figure 12:
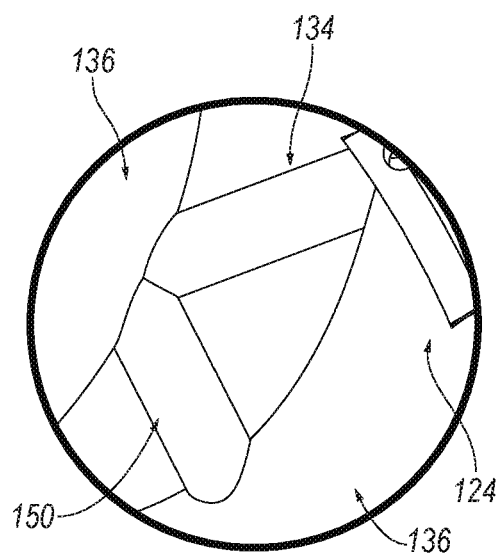
FIG. 12 is an enlarged view of FIG. 10 showing the interconnected relationship between the leading and trailing arms of the slotting cutter, along with a support member directly connecting the trailing arms, according to an embodiment of the invention.

As shown in FIGS. 9, 10 and 12, the slotting cutter 100 further includes a support member 150 that interconnects the trailing arm 136 of a cutting head assembly 124 and the trailing arm 136 of an adjacent cutting head assembly 124. In particular, the support member 150 extends between the trailing arm 136 of a cutting head assembly 124 and the trailing arm 136 of an upstream (i.e., a leading) cutting head assembly 124. In the illustrated embodiment, the support members 150 are substantially concentric about the rotational axis, RA, of the slotting cutter 100. This interlocking relationship between the cutting head assemblies 124 increases the axial, radial and tangential stiffness to weight ratio of the slotting cutter 100, thereby resulting in less deflection of the cutting head assemblies 124.

The patents and publications referred to herein are hereby incorporated by reference.

Having described presently preferred embodiments the invention may be otherwise embodied within the scope of the appended claims.

What is claimed is:

1. A cutting tool having a rotational axis, RA, the cutting tool comprising:
   a cutting ring comprising a cutting head assembly including a leading arm formed with a helical arc extending radially outwardly from the rotational axis, RA, a trailing arm formed with a helical arc extending radially outwardly from the rotational axis, RA, and a cutting head supported by the leading arm and the trailing arm, the cutting ring further comprising a plurality of guide pad assemblies, each guide pad assembly including a leading arm extending radially outwardly from the rotational axis, RA, a trailing arm extending radially outwardly from the rotational axis, RA, and a guide pad head supported by the leading arm and the trailing arm,
   wherein the trailing arm of a cutting head assembly interconnects with the leading arm of a first, adjacent guide pad assembly, and wherein the leading arm of the cutting head assembly interconnects with a trailing arm of a second, adjacent guide pad assembly to increase an axial, radial and tangential stiffness of the cutting tool, thereby increasing a stiffness to weight ratio of the cutting tool.

2. The cutting tool of claim 1, wherein the leading arm of the cutting head assembly extends radially outward from the rotational axis, RA, with a radius of curvature, $R_L$, and wherein the trailing arm of the cutting head assembly extends radially outward from the rotational axis, RA, with a radius of curvature, $R_T$.

3. The cutting tool of claim 2, wherein the trailing arm of the cutting head assembly curves in the same direction as a direction of rotation, R, of the cutting tool, and wherein the leading arm of the cutting head assembly curves in an opposite direction as the direction of rotation, R, of the cutting tool.

4. The cutting tool of claim 1, wherein the cutting ring further comprises a central hub and one or more spokes extending radially outward from the central hub to a sleeve member.

5. The cutting tool of claim 1, further comprising a second cutting ring including a cutting head assembly including a leading arm extending radially outwardly from the rotational axis, RA, a trailing arm extending radially outwardly from the rotational axis, RA, and a cutting head supported by the leading arm and the trailing arm.

6. The cutting tool of claim 5, wherein the trailing arm of the cutting head assembly curves in the same direction as a direction of rotation, R, of the cutting tool, and wherein the leading arm of the cutting head assembly curves in an opposite direction as the direction of rotation, R, of the cutting tool.

7. The cutting tool of claim 1, wherein the cutting tool comprises a reamer.

8. The cutting tool of claim 1, wherein the first, adjacent guide pad assembly is located upstream of the cutting head assembly.

9. The cutting tool of claim 8, wherein the second, adjacent guide pad assembly is located downstream of the cutting head assembly.

10. A cutting ring for a cutting tool, the cutting ring comprising a sleeve member and a plurality of cutting head assemblies, each cutting head assembly including a leading arm formed with a helical arc extending radially outwardly from a rotational axis, RA, of the cutting ring, a trailing arm formed with a helical arc extending radially outwardly from the rotational axis, RA, of the cutting ring, and a cutting head supported by the leading arm and the trailing arm,
   wherein the leading arm of a first cutting head assembly interconnects with the trailing arm of a second, adjacent cutting head assembly to increase an axial, radial and tangential stiffness of the cutting tool, thereby increasing a stiffness to weight ratio of the cutting tool.

11. The cutting ring of claim 10, wherein the trailing arm of the first cutting head assembly interconnects with a leading arm of a third, adjacent cutting head assembly, thereby increasing an axial, radial and tangential stiffness of the cutting tool.

12. The cutting ring of claim 10, wherein the cutting ring comprises a front cutting ring of a reamer.

13. The cutting ring of claim 10, wherein the cutting ring comprises a rear cutting ring of a reamer.

14. The cutting ring of claim 10, wherein the second, adjacent cutting head assembly is upstream of the leading arm of the first cutting head assembly.

15. The cutting ring of claim 14, wherein the third, adjacent cutting head assembly is downstream of the first cutting head assembly.

16. The cutting ring of claim 10, further comprising a support member extending between the trailing arm of the first cutting head assembly and the trailing arm of the second, adjacent cutting head assembly, wherein the support member increases an axial, radial and tangential stiffness of the cutting tool.

17. A cutting tool, comprising:
- a plurality of cutting head assemblies extending radially outward from a rotational axis, RA, of the cutting tool, each cutting head assembly including a leading arm formed with a helical arc, a trailing arm formed with a helical arc and a cutting head supported by the leading arm and the trailing arm; and
- a support member interconnecting the trailing arm of a first cutting head assembly and the trailing arm of a second, adjacent cutting head assembly,
- wherein the leading arm of the first cutting head assembly interconnects with the trailing arm of the second, adjacent cutting head assembly, and the trailing arm of the first cutting head assembly interconnects with a leading arm of a third, adjacent cutting head assembly, and
- wherein the interconnection of the leading and trailing arms along with the support member increases an axial, radial and tangential stiffness of the cutting tool, thereby increasing a stiffness to weight ratio of the cutting tool.

18. The cutting tool of claim 17, wherein the cutting tool comprises a slotting cutter.

* * * * *